US008615874B2

(12) United States Patent
Smith et al.

(10) Patent No.: US 8,615,874 B2
(45) Date of Patent: Dec. 31, 2013

(54) SPLIT FAN WHEEL AND SPLIT SHROUD ASSEMBLIES AND METHODS OF MANUFACTURING AND ASSEMBLYING THE SAME

(75) Inventors: Daniel P. Smith, Spencer, MA (US); Craig A. Penterson, Sutton, MA (US); Richard N. DuVerger, Danielson, CT (US)

(73) Assignee: Riley Power Inc., Worcester, MA (US)

( * ) Notice: Subject to any disclaimer, the term of this patent is extended or adjusted under 35 U.S.C. 154(b) by 35 days.

(21) Appl. No.: 13/348,178

(22) Filed: Jan. 11, 2012

(65) Prior Publication Data

US 2012/0174400 A1 Jul. 12, 2012

Related U.S. Application Data

(62) Division of application No. 12/102,632, filed on Apr. 14, 2008, now Pat. No. 8,132,324, which is a division of application No. 11/233,702, filed on Sep. 23, 2005, now Pat. No. 7,357,342.

(51) Int. Cl.
*B02C 13/00* (2006.01)
*B23P 19/04* (2006.01)

(52) U.S. Cl.
USPC .......................... 29/889; 29/889.3; 241/188.1

(58) Field of Classification Search
USPC ........ 29/888.025, 889.3; 241/100, 182, 285.2
See application file for complete search history.

(56) References Cited

U.S. PATENT DOCUMENTS

| | | | | |
|---|---|---|---|---|
| 593,646 | A | 11/1897 | Donovan | |
| 689,219 | A * | 12/1901 | Merrick | 241/74 |
| 1,020,092 | A | 3/1912 | Griffin | |
| 1,405,581 | A | 2/1922 | Griffith | |
| 1,704,123 | A | 3/1929 | Feinberg et al. | |
| 1,944,474 | A * | 1/1934 | St. Clair | 241/45 |
| 2,459,248 | A | 1/1949 | Smith et al. | |
| 3,788,767 | A | 1/1974 | Bednarczyk et al. | |
| 4,218,186 | A | 8/1980 | Teager et al. | |
| 4,637,750 | A * | 1/1987 | Ward | 403/344 |
| 4,688,987 | A | 8/1987 | Ericson et al. | |
| 4,699,326 | A * | 10/1987 | Warren | 241/275 |
| 5,013,215 | A | 5/1991 | Diehl | |
| 5,233,822 | A * | 8/1993 | Ward et al. | 60/772 |
| 5,295,917 | A | 3/1994 | Hannum | |
| 5,833,562 | A | 11/1998 | Walker, Sr. | |
| 6,042,333 | A | 3/2000 | Day | |
| 6,405,948 | B1 * | 6/2002 | Hahn et al. | 241/1 |
| 7,748,655 | B2 * | 7/2010 | Schmitz et al. | 241/188.1 |
| 2008/0185466 | A1 | 8/2008 | Howard | |

* cited by examiner

*Primary Examiner* — Alexander P Taousakis
(74) *Attorney, Agent, or Firm* — Edwards Wildman Palmer LLP; Joshua L. Jones

(57) ABSTRACT

Devices and systems for transporting a material suspended in a fluid, e.g., pulverized coal, that can be assembled about a rotary element are disclosed. The devices and systems comprise a first portion or half of a fan wheel assembly, a second portion or half of a fan wheel assembly, and a plurality of splice plates for connecting the first portion of the fan wheel assembly to the second portion of the fan wheel assembly about the rotary element. Methods of manufacturing and assembling the sectionalized devices and systems are also provided.

14 Claims, 7 Drawing Sheets

SPLIT FAN WHEEL AND SPLIT SHROUD ASSEMBLIES AND METHODS OF MANUFACTURING AND ASSEMBLYING THE SAME

CROSS-REFERENCE TO RELATED APPLICATION

This application is a divisional of U.S. patent application Ser. No. 12/102,632 filed on Apr. 14, 2008, which is a divisional of U.S. patent application Ser. No. 11/233,702 filed on Sep. 23, 2005, the disclosures of which are hereby incorporated by by reference in their entirety.

BACKGROUND OF THE INVENTION

1. Field of the Invention

This invention relates to devices and systems to facilitate replacing wheels and blades, e.g., on a fan, on a rotary element and, more particularly, to split wheel assemblies, e.g., a fan wheel assembly, and split shroud assemblies for use on a high-speed attrition-type coal pulverizer.

2. Background of the Related Art

In coal-fired furnaces, for purposes of improved and more efficient ignition, it is preferred to pulverize the coal to a fine powder before introducing it into the furnace for combustion. Coal pulverization involves systematically comminuting coal to a desired, preferably optimum size, e.g., a fine powder, prior to introduction into a coal-fired furnace.

Currently, coal pulverization systems include ball-tube-type mills, vertical roller-type mills, and high-speed, attrition-type pulverizers.

Ball-tube-type mills are low speed mills that have their origins in the 1930's and 1940's. The ball-tube-type mill comprises a plurality of hardened steel balls that are disposed in a large, rotatable barrel. While the barrel rotates, coal is introduced into the barrel. Through the rotating action of the barrel, the steel balls fall onto the coal, pulverizing the coal by the impact. The pulverized coal is then removed and fed into a coal-fired furnace. Ball-tube-type mills are successfully used in conjunction with highly abrasive coal. However, they are relatively slow.

Vertical roller-type mills pulverize coal on a rotating grinding table. A plurality of rollers applies a shearing force and a grinding pressure to the coal hydraulically. The pulverized coal is then removed from the mill using a high velocity stream of air and fed into a coal-fired furnace. Although faster than ball-tube-type mills, vertical roller-type mills are only medium speed mills.

Referring to FIG. 1, a high-speed attrition-type pulverizer 10, e.g., an ATRITA®-type pulverizer, will be described. High-speed attrition-type pulverizers provide three-stages of pulverization, in which each stage is powered by a common rotary assembly 12. Essentially, coal enters the first (crushing) section 2 where a plurality of rotating and reciprocating swing hammers 4 crush the coal against a grid 6. The grid deters passage of coal that has not been crushed sufficiently to a preferred nominal size, e.g., about ¼ in. Once the coal has been reduced to a nominal size, it passes through the grid 6 and, subsequently, is introduced into a second (pulverizing) section 8.

The pulverizing section 8 comprises a rotating impeller 14 that divides the section 8 into interconnected upstream portions 1 and downstream portions 3. In the upstream portion 1 of the pulverizing section 8, the rotating impeller 14 causes the coal from the crushing section 2 to rub together, which further reduces the coal size by attrition. Once the coal has reached a desired nominal dimension, it enters the downstream portion 3 of the pulverizing section 8. In the downstream portion 3, the coal is pulverized between a plurality of pegs 7 moving with the impeller 14 at a high speed of rotation and a plurality of stationary pegs 9. The coal is caught between the stationary pegs 9 and further pulverized when the moving pegs 7 pass between the stationary pegs 9.

When the coal in the downstream portion 3 of the pulverizing section 8 is sufficiently pulverized, it exits the pulverizing section 8 through a rejector assembly. On the other side of the rejector assembly, is a third (exhaust) section 13, which transports the fine, pulverized coal in a fluid stream to the coal-fired furnace (not shown). Typically, the exhaust section 13 comprises a rotating fan wheel 15 having a plurality of fan blades 17. A shroud (not shown) can be added to confine the pulverized coal in the exhaust section 13.

Typically, each of the sections of the high-speed, attrition-type pulverizers 10, i.e., the crushing section 2, the pulverizing section 8, and the exhaust section 13, is structured and arranged to be powered by a shared, or common, rotating shaft 12. Further, in many applications, a plurality of high-speed, attrition-type pulverizers 10 is powered by a shared, or common, rotating shaft 12. For example, it is quite common that a twin pulverizer assembly includes two pulverizers 10 in series, where the exhaust section 13 of one pulverizer 10 can be adjacent to the crushing section 2 of the other pulverizer 10 or the exhaust section 13 of one pulverizer 10 can be adjacent to the exhaust section 13 of the other pulverizer 10 or the crushing section 2 of one pulverizer 10 can be adjacent to the crushing section 2 of the other pulverizer 10.

Regardless of the relative arrangement of each pulverizer 10 in a twin pulverizer assembly or, alternatively, whether there is one or more than one pulverizer 10 on a single rotary shaft 12, periodic maintenance and as-needed repair of the fan wheel assembly 15 requires major disassembly of all sections or some portions of one or more pulverizers 10, which is labor- and time-intensive. Accordingly, it would be desirable to provide a pulverizer in which repair of the fan wheel can be performed without labor- and time-intensive disassembly of major portions of the pulverizer.

SUMMARY OF THE INVENTION

In its broadest terms, the present invention provides devices and systems for transporting a material, e.g., pulverized coal, suspended in a fluid, e.g., air, to a coal-fired burner, wherein the devices and systems are sectionalized to allow installation about and removal from a rotary element, e.g., a rotor shaft, and to methods of manufacture and installation of the same. More particularly, this invention provides a pulverizer that includes a split-fan exhaust section, having a first wheel assembly portion and a second wheel assembly portion, that can be removed and installed about a rotary shaft quickly and easily, without having to remove the pulverizer section or any other sections adjacent to the exhaust section.

In a first embodiment, the present invention provides a device for transporting a material suspended in a fluid having a desired nominal size. Preferably, the device comprises a first portion of a fan wheel assembly having a sectionalized hub portion removably attached to a first side of the first portion of the fan wheel assembly; a second portion of a fan wheel assembly having a sectionalized hub portion removably attached to the first side of the second portion of the fan wheel assembly; and a plurality of splice plates for connecting the first portion of the fan wheel assembly to the second portion of the fan wheel assembly about a rotary element; wherein the sectionalized hub portion of said first portion of the fan wheel assembly and the sectionalized hub portion of said second portion of the fan wheel assembly are removably attachable to the rotary element to removably attach the device to said rotary element.

Preferably, each of the first and second portions of the fan wheel assembly includes one or more groups of a plurality of fan blade holes for removably attaching a plurality of fan blades to each of said first and second portions of said fan wheel assembly; a slotted area to prevent intrusion of the material suspended in the fluid between said first and second portions of the fan wheel assembly; and a plurality of balance and counterweight holes for statically and dynamically balancing the fan wheel assembly.

In one aspect of the first embodiment, a plurality of splice plates is provided, including a plurality of alignment holes, e.g., taper pin holes, for aligning the first portion of the fan wheel assembly with the second portion of the fan wheel assembly; and a plurality of splice plate holes for operationally attaching said first portion of the fan wheel assembly to said second portion of the fan wheel assembly.

Optionally, the first embodiment of the present invention can further include a shroud assembly that is removably attached to each of the first and second portions of the fan wheel assembly via the plurality of fan blades that are attached to said first and second portions of the fan wheel assembly. In a preferred embodiment, the shroud assembly comprises a first portion, a second portion, and a plurality of splice plates for connecting the first portion of the shroud assembly to the second portion of the shroud assembly.

Preferably, the plurality of splice plates includes a plurality of alignment holes, e.g., taper pin holes, for aligning the first portion of the shroud assembly with the second portion of the shroud assembly; one or more access holes and one or more pipe plug holes to provide access to a space enclosed between the shroud assembly and the fan wheel assembly; and a plurality of splice plate holes for operationally attaching said first portion of the shroud assembly to said second portion of the shroud assembly.

In a second embodiment, the present invention provides an exhaust system for transporting coal of a desired nominal size to a furnace for ignition. In a preferred embodiment, the device comprises a first portion of a fan wheel assembly having a sectionalized hub portion removably attached to a first side of the first portion of the fan wheel assembly; a second portion of a fan wheel assembly having a sectionalized hub portion removably attached to a first side of the second portion of the fan wheel assembly; and a plurality of splice plates for connecting the first portion of the fan wheel assembly to the second portion of the fan wheel assembly about a rotary element; wherein the sectionalized hub portion of said first portion of the fan wheel assembly and the sectionalized hub portion of said second portion of the fan wheel assembly are removably attachable to the rotary element to removable attach the system to said rotary element.

Optionally, the system further includes a shroud assembly that is removably attached to each of the first and second portions of the fan wheel assembly via a plurality of fan blades that are attached to said first and second portions of the fan wheel assembly. Preferably, the shroud assembly comprises a first portion; a second portion; and a plurality of splice plates for connecting the first portion of the shroud assembly to the second portion of the shroud assembly.

In a third embodiment, the present invention provides an improvement to a high-speed, attrition-type pulverizer. In a preferred embodiment, the pulverizer comprises a crushing section that crushes coal introduced therein; and a grinding section that pulverizes crushed coal from the crushing section. Preferably, the improvement comprising an exhaust section that transports pulverized coal in a fluid having to a furnace that includes: a first portion of a fan wheel assembly having a sectionalized hub portion removably attached to a first side of the first portion of the fan wheel assembly; a second portion of a fan wheel assembly having a sectionalized hub portion removably attached to a first side of the second portion of the fan wheel assembly; and a plurality of splice plates for connecting the first portion of the fan wheel assembly to the second portion of the fan wheel assembly about a rotary element; wherein the sectionalized hub portion of said first portion of the fan wheel assembly and the sectionalized hub portion of said second portion of the fan wheel assembly are removably attachable to the rotary element to removably attach the fan wheel assembly to said rotary element.

Preferably, the plurality of splice plates includes a plurality of alignment holes, e.g., taper pin holes, for aligning the first portion of the fan wheel assembly with the second portion of the fan wheel assembly; a plurality of splice plate holes for operationally attaching said first portion of the fan wheel assembly to said second portion of the fan wheel assembly; and a plurality of balance and counterweight holes for statically and dynamically balancing the fan wheel assembly.

Optionally, the exhaust section further includes a shroud assembly that is removably attached to each of the first and second portions of the fan wheel assembly via a plurality of fan blades that are attached to said first and second portions of the fan wheel assembly. In a preferred embodiment, the shroud assembly comprises a first portion; a second portion; and a plurality of splice plates for connecting the first portion of the shroud assembly to the second portion of the shroud assembly.

Preferably the plurality of splice plates includes a plurality of alignment holes, e.g., taper pin holes, for aligning the first portion of the shroud assembly with the second portion of the shroud assembly; a plurality of splice plate holes for operationally attaching said first portion of the shroud assembly to said second portion of the shroud assembly; a plurality of balance and counterweight holes for statically and dynamically balancing the shroud and/or fan wheel assembly; and one or more access holes and one or more pipe plug holes to provide access to a space enclosed between the shroud assembly and the fan wheel assembly.

In a fourth embodiment, the present invention provides a method of manufacturing a sectionalized device for transporting a material suspended in a fluid, the method comprising the steps of:

providing a fan wheel assembly;

attaching a plurality of splice plates to the fan wheel assembly;

installing a plurality of alignment holes in each of the plurality of splice plates;

removing the plurality of splice plates from the fan wheel assembly; and splitting the fan wheel assembly into two equal or substantially equal halves, e.g., using a laser cutting device or a high-pressure-water cutting device.

In one aspect of the fourth embodiment, the method further comprises the step of providing a slotted area in or near the area where the fan wheel assembly was split. In another aspect, the method further comprises the steps of:

providing a shroud assembly for attachment to the fan wheel assembly;

attaching a plurality of splice plates to the shroud assembly;

installing a plurality of alignment holes in each of the plurality of splice plates;

removing the plurality of splice plates from the shroud assembly; and splitting the shroud assembly into two equal or substantially equal halves, e.g., using a laser cutting device or a high-pressure-water cutting device.

In a fifth embodiment, the present invention provides a method of manufacturing a sectionalized exhaust system for a high-speed, attrition-type pulverizer, the method comprising the steps of:

providing a fan wheel assembly for the exhaust section;

attaching a plurality of splice plates to the fan wheel assembly;

installing a plurality of alignment holes in each of the plurality of splice plates;

removing the plurality of splice plates from the fan wheel assembly; and splitting the fan wheel assembly into two equal or substantially equal halves, e.g., using a laser cutting device or a high-pressure-water cutting device.

In one aspect of the fifth embodiment, the method further comprises the step of providing a slotted area in or near the area where the fan wheel assembly was split. In another aspect, the method further comprises the steps of:

providing a shroud assembly for attachment to the fan wheel assembly;

attaching a plurality of splice plates to the shroud assembly;

installing a plurality of alignment holes in each of the plurality of splice plates;

removing the plurality of splice plates from the shroud assembly; and splitting the shroud assembly into two equal or substantially equal halves, e.g., using a laser cutting device or a high-pressure-water cutting device.

In a sixth embodiment, the present invention provides a method of assembling a sectionalized device for transporting a material suspended in a fluid, the method comprising the steps of:

providing a split fan wheel assembly comprising a first and a section fan wheel portion that includes a slotted area in each of the first and second portion of the fan wheel assembly;

attaching a plurality of splice plates to the first portion of the fan wheel assembly;

positioning said first portion of said fan wheel assembly about a rotary element;

applying a sealant to the slotted area of said first portion of said fan wheel assembly; and attaching said second portion of said fan wheel assembly to said first portion.

Preferably, the step of attaching the second portion of the fan wheel assembly about the rotary element includes the steps of aligning the first and second portions of the fan wheel assembly using alignment holes in each of the plurality of splice plates; and attaching the first and second portions of the fan wheel assembly using a plurality of attaching devices.

In one aspect of the sixth embodiment, the method comprises the further step of balancing the fan wheel assembly and/or the further steps of:

providing a split shroud assembly having a first and a second portion;

attaching a plurality of splice plates to the first portion of the shroud assembly;

positioning a first portion of the shroud assembly about the rotary element; and attaching the second portion of said shroud assembly to said first portion.

Preferably, the split plates of the portions of the fan wheel assembly and the splice plates of the portions of the shroud assembly are disposed about 90 degrees with respect to each other. More preferably, the step of attaching the second portion of the shroud assembly about the rotary element includes the steps of aligning the first and second portions of the shroud assembly using alignment holes in each of the plurality of splice plates; and attaching the first and second portions of the shroud assembly using a plurality of attaching devices.

Optionally, the method comprises the further step of balancing the fan wheel and shroud assemblies.

In a seventh embodiment, the present invention provides a method of assembling a sectionalized exhaust fan for a high-speed attrition-type pulverizer, the method comprising the steps of:

providing a split fan wheel assembly that comprises a first and a second fan wheel portion that includes a slotted area in each of a first and second portion of the fan wheel assembly;

attaching a plurality of splice plates to the first portion of the fan wheel assembly;

positioning said first portion of said fan wheel assembly about a rotary element in the exhaust portion of the pulverizer;

applying a sealant to the slotted area of said first portion of said fan wheel assembly; and attaching said second portion of said fan wheel assembly to said first portion.

Preferably, the step of attaching the second portion of the fan wheel assembly about the rotary element includes the steps of aligning the first and second portions of the fan wheel assembly using alignment holes in each of the plurality of splice plates; and attaching the first and second portions of the fan wheel assembly using a plurality of attaching devices. Optionally, the method comprises the further step of balancing the fan wheel assembly.

In one aspect of the seventh embodiment, the method comprises the further steps of:

providing a split shroud assembly having a first and a second portion;

attaching a plurality of splice plates to the first portion of the shroud assembly;

positioning a first portion of the shroud assembly about the rotary element; and attaching the second portion of said shroud assembly to said first portion.

Preferably the split plates of the portions of the fan wheel assembly and the splice plates of the portions of the shroud assembly are disposed about 90 degrees with respect to each other. More preferably, the step of attaching the second portion of the shroud assembly about the rotary element includes the steps of aligning the first and second portions of the shroud assembly using alignment holes in each of the plurality of splice plates; and attaching the first and second portions of the shroud assembly using a plurality of attaching devices. Optionally, the method comprises the further step of balancing the fan wheel and shroud assemblies.

BRIEF DESCRIPTION OF THE DRAWINGS

The invention will be better understood by reference to the following more detailed description and accompanying drawings where like reference numbers refer to like parts.

DETAILED DESCRIPTION OF THE INVENTION INCLUDING PREFERRED EMBODIMENTS

Figure 1:
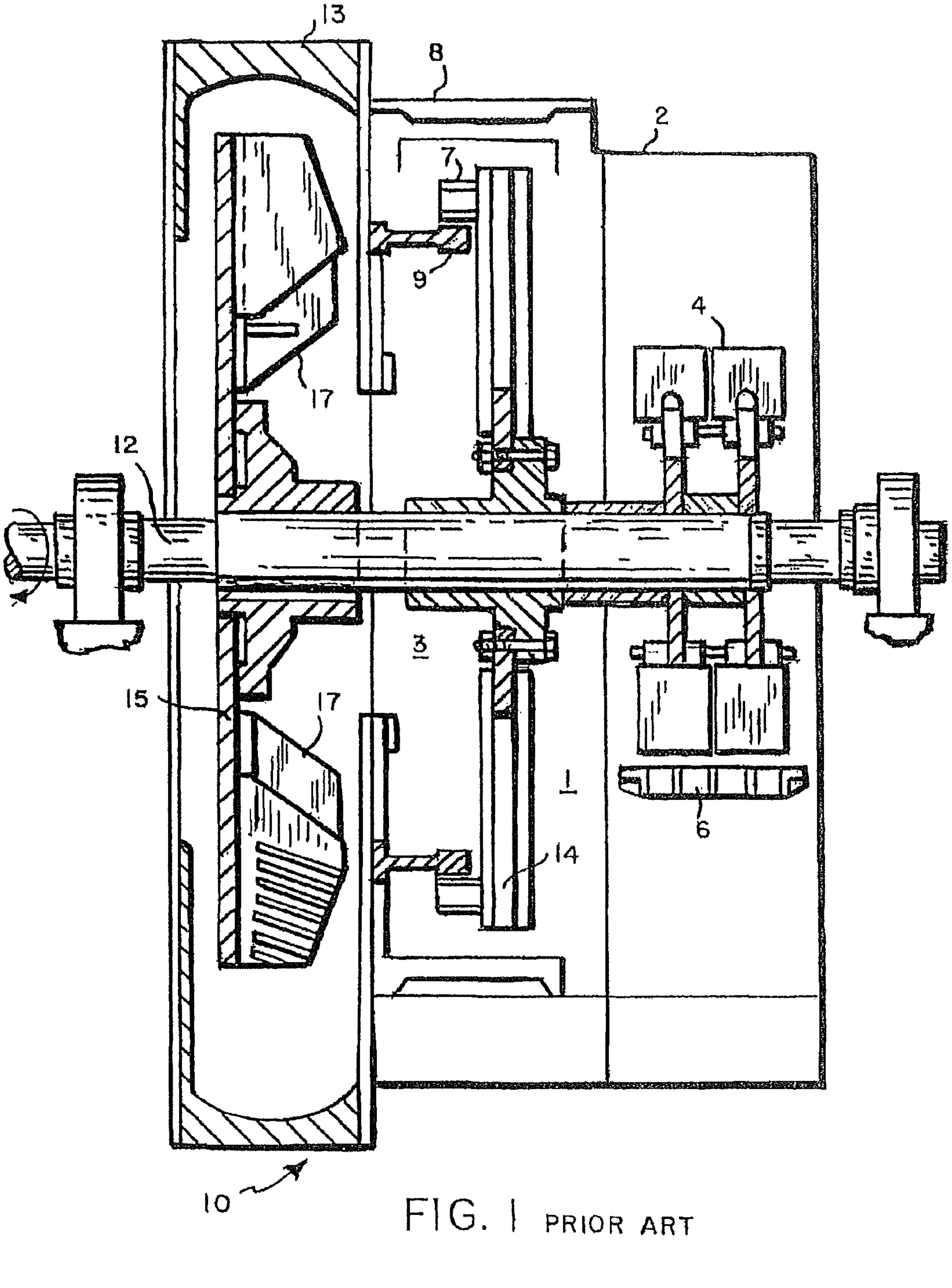
FIG. 1 PRIOR ART
FIG. 1 is a diagram of a high-speed, attrition-type pulverizer that is known to those of ordinary skill in the art.
Figures 2A, 2B, 2C:
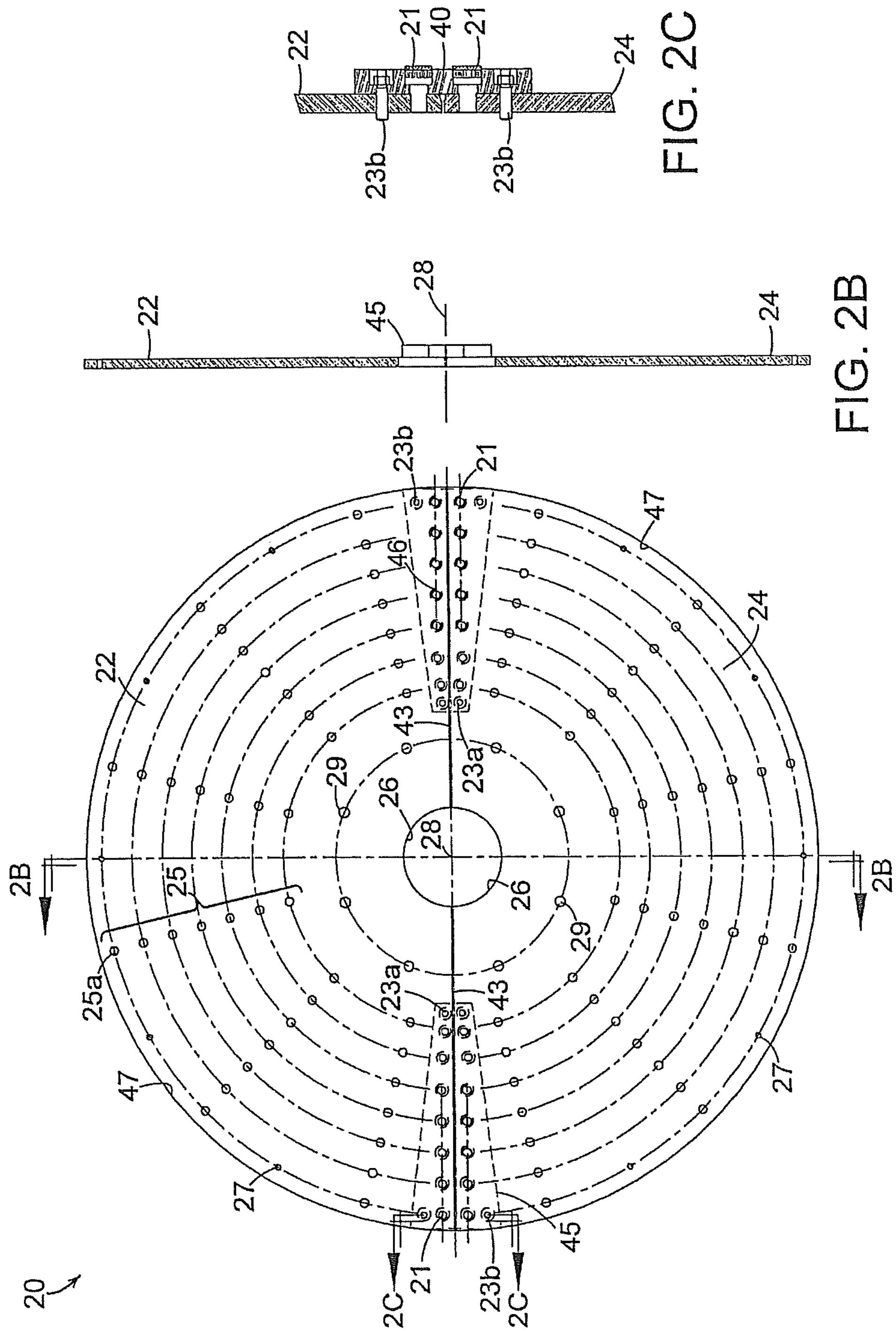
FIGS. 2*a*-2*c* provide illustrative embodiments of a split fan wheel assembly in accordance with the present invention.

Referring to FIG. 2*a*-2*c*, an illustrative embodiment of a split fan wheel assembly 20 in accordance with the present invention will be described. In FIG. 2*a*, there is shown an embodiment of the split fan wheel assembly 20 that comprises a first fan wheel portion 22 and a second fan wheel portion 24. In a preferred embodiment, to conjoin the fan wheel portions 22 and 24, a plurality splice plates 45 and 46 is removably attached to the each of the fan wheel portions 22 and 24. Preferably, the splice plates 45 and 46 are trapezoidal or substantially trapezoidal in shape having a base, or longer, portion furthest away from the center of the fan wheel assembly 28.

Preferably, each of the first and second fan wheel portions 22 and 24 are semi-circular in shape and include a center cut-out region 26 that, likewise, is semi-circular in shape. In a preferred embodiment the dimensions of the center cut-out region 26 are structured and arrange to fit about a rotor section of a rotary element. More preferably, each of the first and second fan wheel portions 22 and 24 is structured and arranged to be removably attachable to the other. Those skilled in the art can appreciate that, the dimensions, e.g., diameter, and thickness of each of the fan wheel portions 22 and 24 can be varied to provide larger or smaller high-speed attrition-type pulverizers. For example, the present inventors have adapted the invention to provide 60-inch and 84-inch diameter fan wheel assemblies 20 that are approximately ¾ inches thick.

In one aspect of the present invention, each of the fan wheel portions 22 and 24 includes a plurality of splice plate holes 21; a plurality of taper pin holes 23*a* and 23*b*; a plurality of fan blade holes 25*a*; a plurality of balance and counterweight holes 27; and a plurality of hub assembly holes 29. The plurality of hub assembly holes 29 can be structured and arranged about the center cut-out region 26 for the purpose of removably securing a sectionalized fan hub assembly (not shown) to each of the fan wheel portions 22 and 24. Preferably, each portion of the sectionalized fan hub assembly is removably attached to the first or second fan wheel portions 22 or 24 using a plurality of bolts having corresponding nuts. Although FIG. 2A shows four hub assembly holes 29 arranged circumferentially, equidistant from the center of the fan wheel assembly 28 on each of the fan wheel portions 22 and 24, the invention is not to be construed as being limited thereto. More or fewer hub assembly holes 29 can be included and the holes 29 do not have to be structured and arranged circumferentially and/or equidistant from the center of the fan wheel assembly 28.

The plurality of balance and counterweight holes 27 is used to provide static and dynamic balance to the split fan wheel assembly 20. Preferably, the plurality of balance and counterweight holes 27 is provided near or in proximity of the outer periphery 47 of the first and second fan wheel portions 22 and 24. Although FIG. 2A shows five balance and counterweight holes 27 arranged circumferentially, equidistant from the center of the fan wheel assembly 28 on each of the fan wheel portions 22 and 24, the invention is not to be construed as being limited thereto. More or fewer balance and counterweight holes 27 can be included and the holes 27 do not have to be structured and arranged circumferentially and/or equidistant from the center of the fan wheel assembly 28. Those of ordinary skill in the art are familiar with the process of statically and dynamically balancing a fan wheel assembly, so the process will not be described further herein.

In another aspect of the present invention, each of the fan wheel portions 22 and 24 includes a plurality of fan blade holes 25*a* that are structured and arranged for the purpose of removably securing a plurality of fan blades (not shown) to the fan wheel portions 22 and 24. Preferably, the plurality of fan blade holes 25*a* are structured and arranged in groups 25 oriented in a radial direction from the center of the fan wheel assembly 28. More preferably, each group of holes 25 is structured and arranged to correspond to the location of the fan blades. Although FIG. 2A shows six groups 25 of seven fan blade holes 25*a* structured and arranged radially about the center of the fan wheel assembly 28 on each fan wheel portion 22 and 24, the invention is not to be construed as being limited thereto. More or fewer fan blade holes 25*a* and or groups 25 can be included on the fan wheel portions 22 and 24. Moreover, the holes 25*a* do not have to be structured and arranged in a straight line radiating from the center of the fan wheel assembly 28. For example, the fan blade holes 25*a* can be slightly staggered to either side of a radial line extending from the center of the fan wheel assembly 28.

The pluralities of splice plate holes 21 and taper pin holes 23*a* and 23*b* secure the splice plates 45 and 46 to the two fan wheel portions 22 and 24 to provide a split fan wheel assembly 20 and properly align the fan wheel portions 22 and 24, respectively. Preferably, the pluralities of splice plate holes 21 and taper pin holes 23*a* and 23*b* are structured and arranged on both of the first and second fan wheel portions 22 and 24, near and along the diameters 48 of the first and second fan wheel portions 22 and 24. More preferably, the fan wheel portions 22 and 24 are structured and arranged with splice plates 45 and 46 disposed on the same side of the fan wheel portions 22 and 24. Alternatively, one splice plate can be on a front side of one of the fan wheel portions and the other splice plate can be on the back side of the other fan wheel portion or smaller splice plates 45 and 46 can be provided on the front and back sides of both of the fan wheel assembly portions 22 and 24.

The plurality of splice plate holes 21 is used for mounting the splice plates 45 and 46 to conjoin the fan wheel portions 22 and 24. Preferably, the pluralities of splice plate holes 21 on each splice plate 45 and 46 are structured and arranged in a staggered, radial direction about the center of the fan wheel assembly 28. Although FIG. 2A shows two groups of seven splice plate holes 21 structured and arranged radially about the center of the fan wheel assembly 28 on each splice plate 45 and 46, the invention is not to be construed as being limited thereto. For example, more or fewer splice plate holes 21 can be included. Preferably, for reasons associated with shear stress, splice plate holes 21 for securing splice plates 45 and 46 to the fan wheel assembly portion 22 and 24 are slightly staggered to either side of a radial line extending from the center of the fan wheel assembly 28.

In yet another aspect of the present invention, each splice plate 45 and 46 includes a plurality of inner taper pin holes 23*a* and a plurality of outer taper pin holes 23*b*. Taper pin holes 23*a* and 23*b* are used to ensure proper alignment of the splice plates 45 and 46 and the fan wheel portions 22 and 24. Preferably, each fan wheel portion 22 and 24 includes at least one of each taper pin holes 23*a* and 23*b* per splice plate 45 and 46. Although FIG. 2A shows one inner and one outer taper pin hole 23*a* and 23*b* per splice plate 45 and 46 per fan wheel portion 22 and 24, the invention is not to be construed as being limited thereto. For example, more taper pin holes 23*a* and/or 23*b* can be included on either or both splice plates 45 and 46 without violating the scope and spirit of this disclosure.

In another aspect of the embodied split fan wheel assembly 20, each of the first and second portions 22 and 24 includes a slotted area 40 to prevent pulverized coal from entering and/or penetrating into the "split", preventing erosion of the split fan wheel assembly 20. Referring to FIG. 2C, preferably, the slotted area 40 is structured and arranged along the length of the diameters 48 of the two portions 22 and 24. More preferably, the slotted area 40 is about ¼-inch wide by about ¼-inch deep to receive a bead of a sealant material.

Optionally, the above-described split fan wheel assembly 20 can be shrouded to confine the pulverized coal between the shroud assembly 30 and the fan wheel assembly 20 so that more of the pulverized coal is available for delivery to the coal-fired furnace. Preferably, the shroud assembly 30 is removably attached to the fan blades (not shown).

Figure 3:
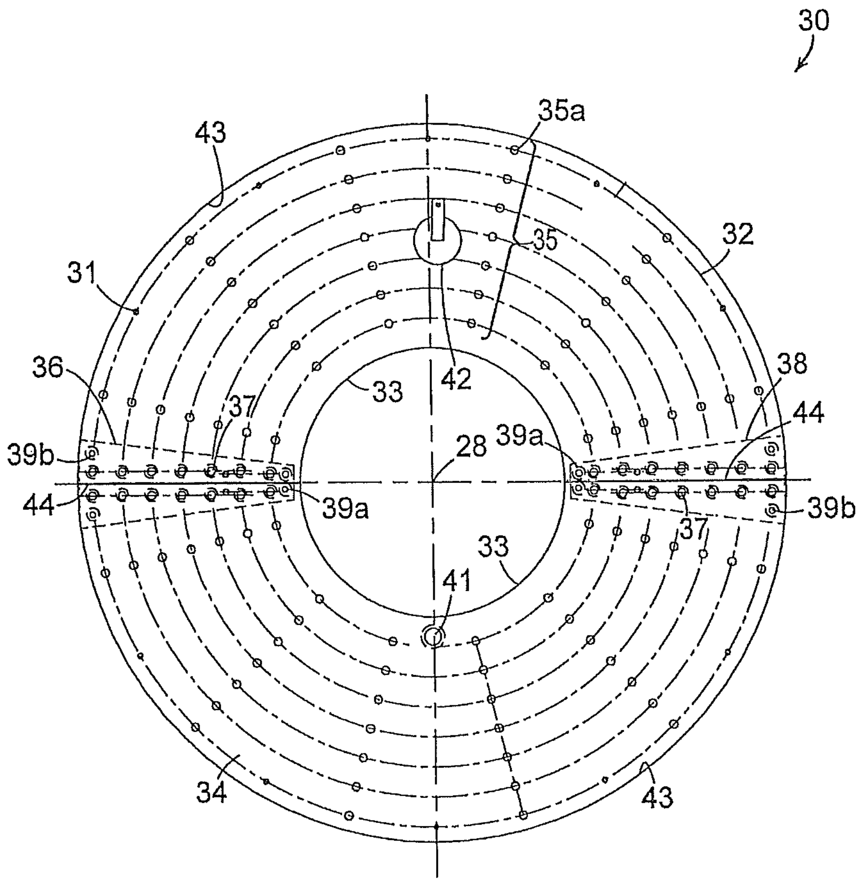
FIG. 3 provides an illustrative embodiment of a plan view of a split shroud assembly for a split fan wheel assembly in accordance with the present invention.

Referring to FIG. 3, there is shown a preferred embodiment of the fan wheel shroud assembly 30 that comprises a first shroud portion 32 and a second fan wheel portion 34. In a preferred embodiment, to conjoin the shroud portions 32 and 34, a plurality of splice plates 36 and 38 is removably attached to the each of the shroud portions 32 and 34. Preferably, the splice plates 36 and 38 are trapezoidal or substantially trapezoidal in shape having a base, or longer, portion furthest away from the center of the fan wheel assembly 28.

Preferably, each of the first and second shroud portions 32 and 34 is semi-circular in shape and include a center cut-out region 33 that, likewise, is semi-circular in shape. More preferably, each of the first and second shroud portions 32 and 34 is structured and arranged to be removably attachable to the other. Those skilled in the art can appreciate that, the dimensions, e.g., diameter, and thickness of each of the shrouds 32 and 34 can be varied to provide larger or smaller high-speed attrition-type pulverizers. For example, the present inventors have adapted the invention to provide 60-inch and 84-inch diameter fan wheel assemblies 20.

The cut-out sections 33 of the shroud assembly 30 are larger than the cut-out sections 26 of the fan wheel portions 22 and 24 to provide a relatively large open area for air flow to enter the exhaust section between the shroud assembly 30 and the fan wheel assembly 20.

In one aspect of the present invention, each of the shroud portions 32 and 34 includes a plurality of splice plate holes 37; a plurality of taper pin holes 39*a* and 39*b*; a plurality of fan blade holes 35*a*; a plurality of balance and counterweight holes 31; one or more pipe plug holes 41; and one or more access holes 42. The access hole 42 is structured and arranged at a discrete location on one of the shroud portions 32 and 34 to align with the rejector assembly of the pulverizing section. The dimension of the access hole 42 should be compatible with the size of the rejector assembly. Although FIG. 3 shows only a single access hole 42, the invention is not to be construed as being so limited as more access holes can be included without violating the scope and spirit of this disclosure.

One or more pipe plug holes 41 is structured and arranged at a discrete location on one of the shroud portions 32 and 34 to provide access to the inner space between the shroud assembly 30 and the fan wheel assembly 20.

The plurality of balance and counterweight holes 31 is used to provide static and dynamic balance to the shroud wheel assembly 30. Preferably, the plurality of balance and counterweight holes 31 is provided near or in proximity of the outer periphery 43 of the first and second shroud portions 32 and 34. Although FIG. 3 shows five balance and counterweight holes 31 arranged circumferentially, equidistant from the center of the fan wheel assembly 28 on each of the shroud portions 32 and 34, the invention is not to be construed as being limited thereto. More or fewer balance and counterweight holes 31 can be included and the holes 31 do not have to be structured and arranged circumferentially and/or equidistant from the center of the fan wheel assembly 28. Those of ordinary skill in the art are familiar with the process of statically and dynamically balancing a fan wheel and a shroud assembly, so the process will not be described further herein.

In another aspect of the present invention, each of the shroud portions 32 and 34 includes a plurality of fan blade holes 35*a* that are structured and arranged for the purpose of removably securing the shroud assembly 30 to a plurality of fan blades (not shown). Preferably, the plurality of fan blade holes 35*a* are structured and arranged in groups 35 oriented in a radial direction from the center of the fan wheel assembly 28. More preferably, each group of holes 35 is structured and arranged to correspond to and to align with the location of the fan blades. Although FIG. 3 shows six groups 35 of seven fan blade holes 35*a* structured and arranged radially about the center of the fan wheel assembly 28 on each shroud portion 32 and 34, the invention is not to be construed as being limited thereto. More or fewer fan blade holes 35*a* and or groups 35 can be included on the shroud portions 32 and 34. Moreover, the holes 35*a* do not have to be structured and arranged in a straight line radiating from the center of the fan wheel assembly 28. For example, the fan blade holes 35*a* can be slightly staggered to either side of a radial line extending from the center of the fan wheel assembly 28.

The pluralities of splice plate holes 37 and taper pin holes 39*a* and 39*b* secure the splice plates 36 and 38 to the two shroud portions 32 and 34 to provide a split shroud assembly 30 and properly align the shroud portions 32 and 34, respectively. Preferably, the pluralities of splice plate holes 37 and taper pin holes 39*a* and 39*b* are structured and arranged on both of the shroud portions 32 and 34, near and along the diameters 44 of the first and second shroud portions 32 and 34. More preferably, the shroud portions 32 and 34 are structured and arranged with splice plates 36 and 38 disposed on the same side of the shroud portions 32 and 34. Alternatively, one splice plate can be disposed on a front side of the shroud portions and the other splice plate can be disposed on the back side of the shroud portions or smaller splice plates 36 and 38 can be provided on both of the front and back sides of the shroud portions.

The plurality of splice plate holes 37 is used for mounting the splice plates 36 and 38 to conjoin the shroud portions 32 and 34. Preferably, the pluralities of splice plate holes 37 on each splice plate 36 and 38 are structured and arranged in a staggered, radial direction about the center of the fan wheel assembly 28. Although FIG. 3 shows two groups of seven splice plate holes 37 structured and arranged radially about the center of the fan wheel assembly 28 on each splice plate 36 and 38, the invention is not to be construed as being limited thereto. For example, more or fewer splice plate holes 37 can be included. Preferably, for reasons associated with shear stress, splice plate holes 37 for securing splice plates 36 and 38 to the shroud portions 32 and 34 can be slightly staggered to either side of a radial line extending from the center of the fan wheel assembly 28.

In yet another aspect of the present invention, each splice plate 36 and 38 includes a plurality of inner taper pin holes 39*a* and a plurality of outer taper pin holes 39*b*. Taper pin holes 39*a* and 39*b* are used to ensure proper alignment of the splice plates 36 and 38 and the shroud portions 32 and 34. Preferably, each shroud portion 32 and 34 includes at least one of each taper pin holes 39*a* and 39*b* per splice plate 36 and 38. Although FIG. 3 shows one inner and one outer taper pin holes 39*a* and 39*b* per splice plate 36 and 38 per shroud portion 32 and 34, the invention is not to be construed as being limited thereto. For example, more taper pin hole 39*a* and/or 39*b* can be included on either or both splice plates 36 and 38 without violating the scope and spirit of this disclosure.

Figure 4:
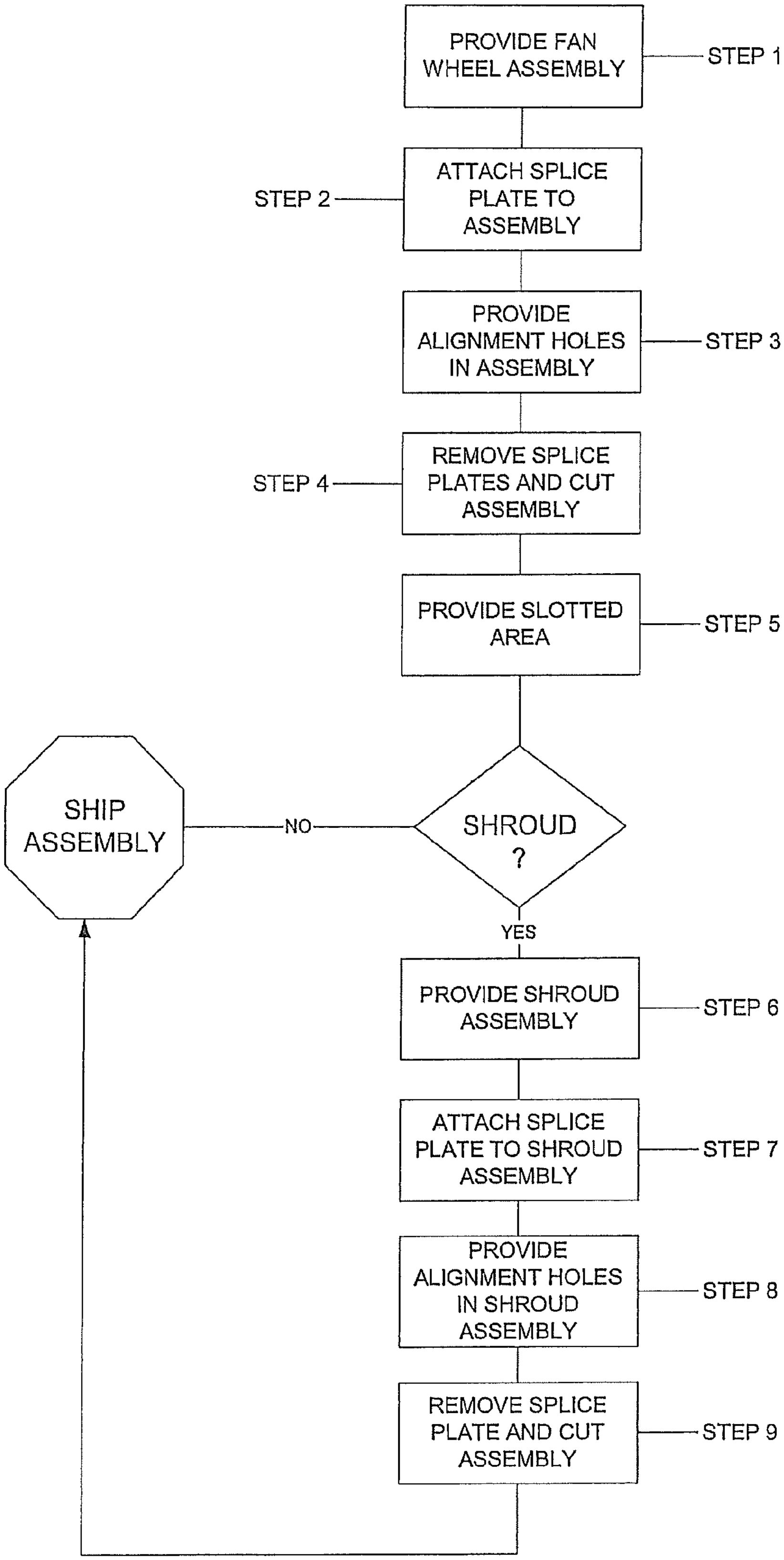
FIG. 4 provides a flow chart of a method of manufacturing a split fan wheel assembly and a split shroud assembly in accordance with the present invention.

Having described preferred embodiments of a split fan wheel assembly 20 and a split shroud assembly 30, methods of manufacturing and assembling the same will now be described. Referring to FIG. 4, a flow chart of a preferred method of manufacturing a split fan wheel assembly with or without a shroud assembly is shown.

In a first step, a fan wheel assembly and a plurality of splice plates can be provided and/or manufactured. Preferably, pluralities of splice plate holes, fan blade holes, balance and counterweight holes, and hub assembly holes are provided, e.g., drilled, in discrete locations in the fan wheel assembly (STEP 1). In a second step, the plurality of splice plates can be removably attached to the fan wheel assembly (STEP 2), e.g., bolted using socket head cap screws.

After the splice plates have been attached to the fan wheel assembly, holes for the plurality of taper pins can be provided, e.g., reamed, and taper pins can be installed in the resulting holes (STEP 3) to ensure proper alignment of the fan wheel assembly portions after the fan wheel assembly is split. Preferably, because a torque force will be applied to the taper pins, the taper pins can be lubricated before they are installed in the taper pin holes. More preferably, each of the nuts for the taper pins will be installed, at first, by hand. Then, the corresponding nut of one of the taper pins can be tightened, e.g., using a torque wrench, until the nut achieves full engagement. Then, about an additional 25 ft.-lbs. can be added to the taper pin. This torque value can be recorded for subsequent use as subsequent taper pins can be tightened to a torque value equal to the recorded torque value plus about 25 ft.-lbs.

Having prepared the plurality of taper pin holes, the splice plates can be removed and the fan wheel assembly split or cut along its diameter into two equal or substantially equal halves (STEP 4), e.g., using a laser or high-pressure water cutting device. Those skilled in the art will appreciate that there exist a myriad means of cutting the fan wheel assembly in half, all of which are included in this disclosure. Preferably, at or near the time that the fan wheel assembly is split, a slotted area, e.g., a ¼-inch wide by ¼-inch deep slot, can be included along the diameter of the fan wheel assembly halves (STEP 5).

The split fan wheel assembly, splice plates, and all associated pins, taper pins, screws, and the like can be shipped in pieces or, more preferably, the device can be re-assembled after the fan wheel assembly has been halved and shipped as a whole. Optionally, if the split fan wheel assembly is shipped fully assembled, static and dynamic balance testing can be performed prior to shipment in manners that are well-known to those of ordinary skill in the art.

If the split fan wheel assembly is to be shrouded, the manufacturing steps include the following. In a sixth step, a shroud assembly and a plurality of splice plates can be provided and/or manufactured. Preferably, pluralities of splice plate holes, fan blade holes, balance and counterweight holes, hub assembly holes, access holes, and pipe plug holes are provided, e.g., drilled, in discrete locations in the shroud assembly (STEP 6). In a seventh step, the plurality of splice plates can be removably attached (STEP 7), e.g., bolted using socket head cap screws, to the shroud assembly.

After the splice plates have been attached to the shroud assembly, holes for the plurality of taper pins can be provided, e.g., reamed, and taper pins can be installed in the resulting holes (STEP 8) to ensure proper alignment of the shroud assembly portions after the shroud assembly is split. Preferably, because a torque force will be applied to the taper pins, the taper pins can be lubricated before they are installed in the taper pin holes. More preferably, each of the nuts for the taper pins will be installed, at first, by hand. Then, the corresponding nut of one of the taper pins can be tightened, e.g., using a torque wrench, until the nut achieves full engagement. The torque value should be recorded for subsequent use and then about an additional 25 ft.-lbs. can be added to the taper pin. Subsequently, each of the other taper pins should be tightened to a torque value equal to the recorded torque value plus about 25 ft.-lbs.

Having prepared the plurality of taper pin holes, the splice plates can be removed and the shroud assembly split or cut along its diameter into two equal or substantially equal halves (STEP 9), e.g., using a laser or high-pressure water cutting device. Those skilled in the art will appreciate that there exist a myriad means of cutting the shroud assembly in half, all of which are included in this disclosure.

As with the split fan wheel assembly, the split shroud assembly, splice plates, and all associated pins, taper pins, screws, and the like can be shipped in pieces or, more preferably, the shroud assembly can be re-assembled after the fan wheel and shroud assemblies have been halved and shipped as a whole. Optionally, if the split shroud assembly is shipped fully assembled, static and dynamic balance testing can be performed prior to shipment in manners that are well-known to those of ordinary skill in the art.

Figure 5:
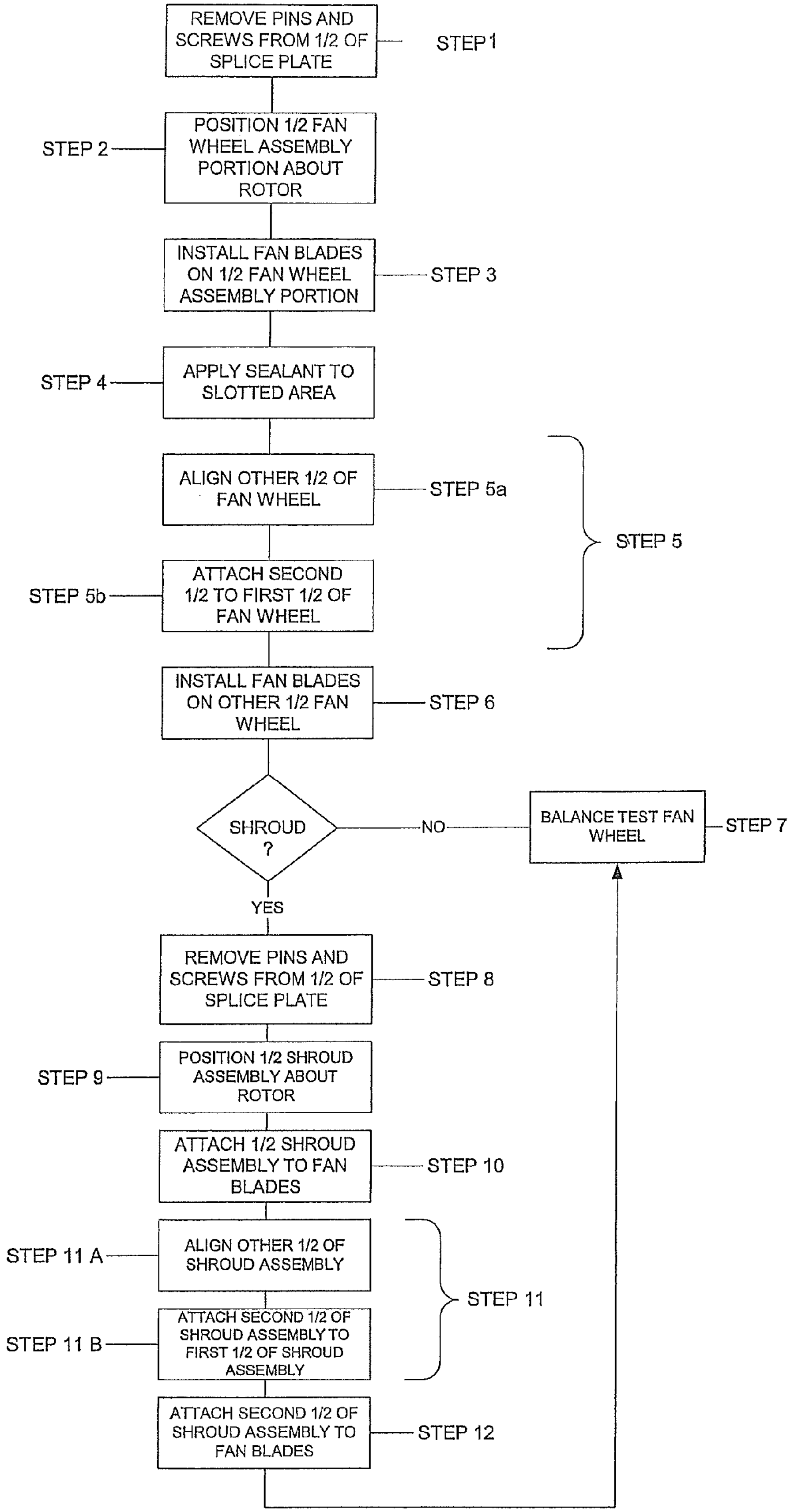
FIG. 5 provides a flow chart of a method of re-assembling a split fan wheel assembly and a split shroud assembly in accordance with the present invention.

Having described methods of manufacture and shipping of a shrouded or unshrouded split fan wheel assembly, methods of installing the split fan wheel about the rotor of a rotary element will now be described. The embodied methods assume that the split fan wheel assembly is shipped fully assembled. Referring to FIG. 5, in a first step, all of the socket head cap screws and taper pins that are connecting the splice plates to one of the fan wheel assembly portions can be removed, leaving the socket head cap screws and taper pins that are connecting the splice plates to the other fan wheel assembly portion in place (STEP 1). The fan wheel assembly portion having the splice plates still attached can then be positioned about the rotor in the exhaust section of the high-speed attrition-type pulverizer (STEP 2).

With one portion, i.e., the first portion, of the fan wheel assembly positioned about the rotor, next, the fan blades can be installed, e.g., using nuts and bolts, on the first portion of the fan wheel assembly (STEP 3).

In a fourth step, a sealant can be applied to the portion of the ¼-inch wide by ¼-inch deep slotted area near the installed splice plate (STEP 4). The sealant prevents pulverized coal from entering and/or penetrating into the "split", preventing erosion of the wheel and/or shroud split edges. Preferably, the sealant is an adhesive-type sealant, e.g., an RTV-type silicone sealant. More preferably, the sealant is applied in an approximately ⅜-inch bead.

The second portion, or half, of the split fan wheel assembly can then be installed and removably secured to the first portion, or half, of the split fan wheel assembly (STEP 5). Preferably, once the second half of the split fan wheel assembly is properly aligned, the plurality of taper pins can be inserted in the taper pin holes (STEP 5*a*). More preferably, the plurality of taper pins is inserted in the taper pin holes after being lubricated. Most preferably, the nuts of the inserted taper pins can be tightened, e.g., using a torque wrench, to a torque equal to the recorded torque value plus about 25 ft.-lbs.

Once all of the taper pins have been properly installed and tightened (STEP 5*a*), the split fan wheel assembly is properly aligned. Accordingly, the plurality of attaching devices, e.g., socket head screw caps, can be installed in the splice plates and tightened (STEP 5*b*). Preferably, the plurality of socket head screw caps are installed in the splice plate holes after being lubricated. Most preferably, the nuts, e.g., vibration-resistant, friction-fit locking nuts, of the inserted socket head screw caps can be tightened, e.g., using a torque wrench, to about 200 ft.-lbs. plus or minus about 10 ft.-lbs.

Having completed the assembly and alignment of the two halves of the split fan wheel assembly, the fan blades can be removably attached to the second half of the split fan wheel assembly (STEP 6). Optionally, the mounted split fan wheel assembly can be tested for static and dynamic balancing (STEP 7) in manners that are well-known to those of ordinary skill in the art.

If the split fan wheel assembly is shrouded, the following additional steps are needed. In an eighth step, all of the socket head cap screws and taper pins that are connecting the splice plates to one of the shroud assembly portions can be removed, leaving the socket head cap screws and taper pins that are connecting the splice plates to the other shroud assembly portion in place (STEP 8). The shroud assembly portion having the splice plates still attached can then be positioned about the rotor and the fan wheel assembly (STEP 9). Preferably, the splice plates of the split fan wheel assembly and splice plates for the shroud assembly are positioned about the rotor about 90 degrees from each other so that the splices do not coincide.

With one portion, i.e., the first portion, of the shroud assembly positioned about the rotor and the fan wheel assembly portion, the shroud assembly portion can be removably attached to the fan blades, e.g., using nuts and bolts (STEP 10). The second portion, or half, of the shroud assembly can then be installed and removably secured to the first portion, or half, of the shroud assembly (STEP 11). In a preferred embodiment, once the second half of the shroud assembly is properly aligned, the plurality of taper pins can be inserted in the taper pin holes (STEP 11*a*). Preferably, the plurality of taper pins is inserted in the taper pin holes after being lubricated. More preferably, the nuts of the inserted taper pins can be tightened, e.g., using a torque wrench, to a torque equivalent to the recorded torque value plus about 25 ft.-lbs.

Once all of the taper pins have been properly installed and tightened (STEP 11*a*), the shroud assembly is properly aligned. Accordingly, the plurality of socket head screw caps can be installed in the splice plates and tightened (STEP 11*b*). Preferably, the plurality of socket head screw caps are installed in the splice plate holes after being lubricated. More preferably, the nuts, e.g., vibration-resistant, friction-fit locking nuts, of the inserted socket head screw caps can be tightened, e.g., using a torque wrench, to about 200 ft.-lbs. plus or minus about 10 ft.-lbs.

The second portion, or half, of the shroud assembly can then be removably attached to the fan blades, e.g., using nuts and bolts (STEP 12). Optionally, the mounted split fan wheel and shroud assembly can be tested for static and dynamic balancing (STEP 7) in manners that are well-known to those of ordinary skill in the art.

Figure 6:
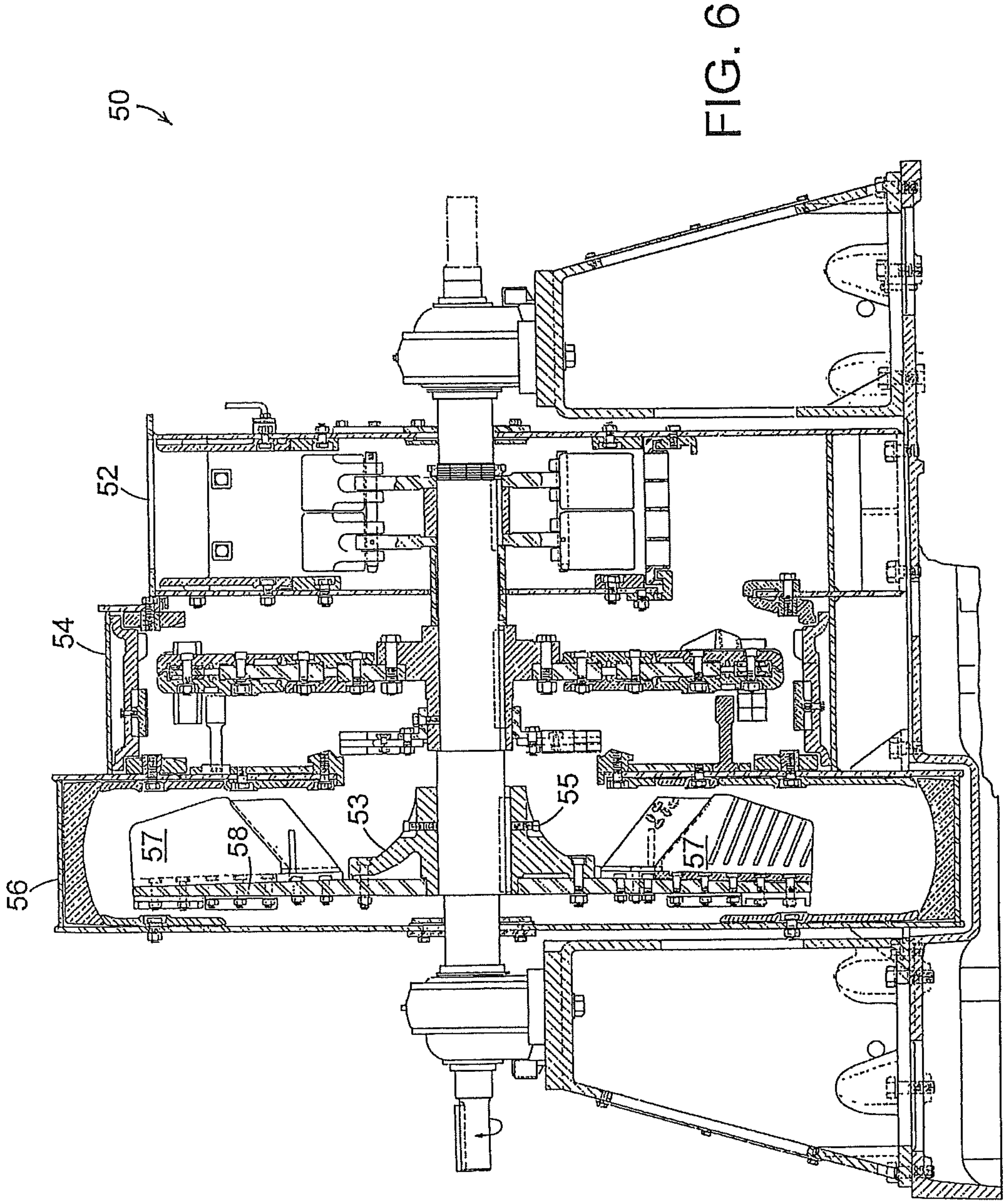
FIG. 6 is an illustrative embodiment of an unshrouded split fan wheel assembly in accordance with the present invention.
Figure 7:
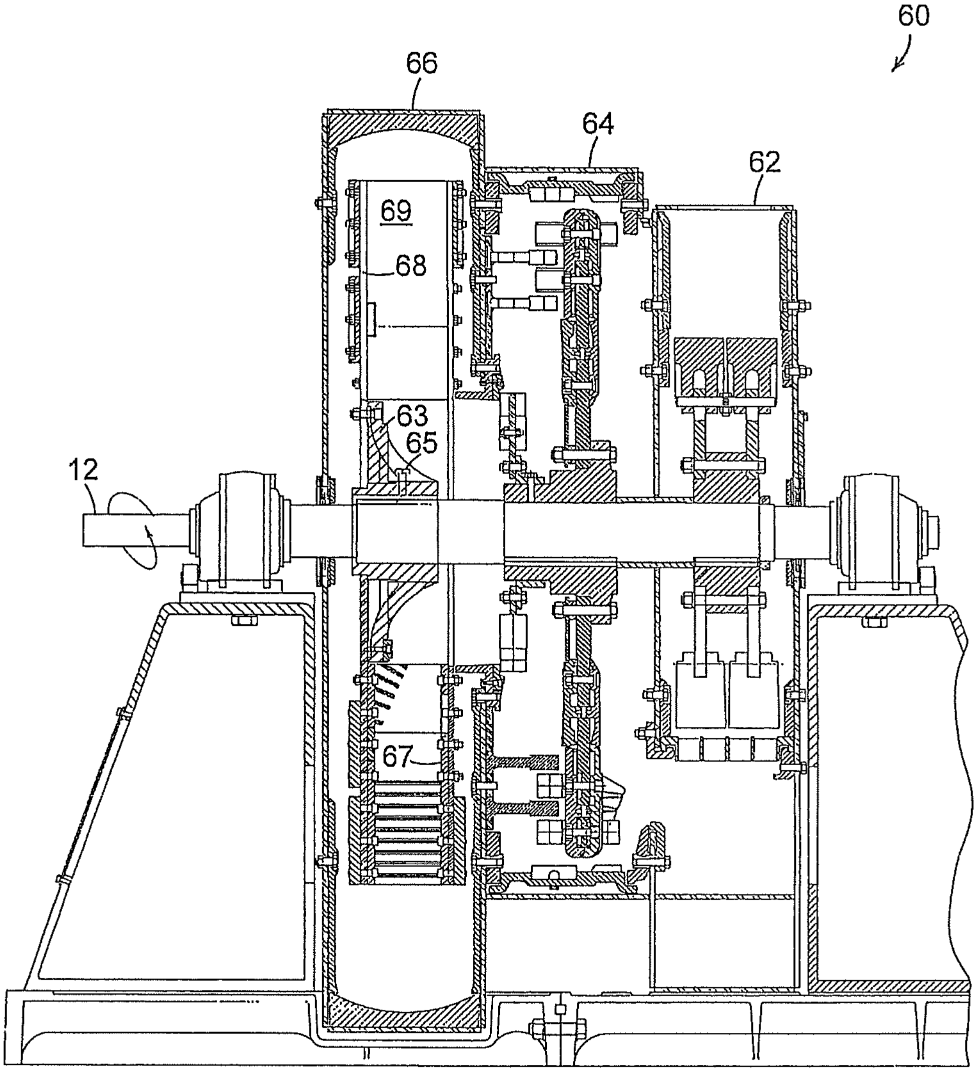
FIG. 7 is an illustrative embodiment of a shrouded split fan wheel assembly in accordance with the present invention.

Having now described methods of manufacturing and reassembling preferred embodiments of shrouded and unshrouded split fan wheel assemblies, high-speed attrition-type coal pulverizers using the same will now be described. Referring to FIGS. 6 and 7, there are shown, embodiments of high-speed attrition-type coal pulverizers having split fan wheel assemblies. FIG. 6 illustrates an open, or unshrouded, high-speed attrition-type coal pulverizer 50 and FIG. 7 illustrates a shrouded high-speed attrition-type coal pulverizer 60.

Each embodiment comprises a crushing section 52 and 62; a grinding section 54 and 64; and an exhaust section 56 and 66 that are driven by a common rotor shaft 12. The exhaust sections 56 and 66 include an open, split fan wheel assembly 58 and a shrouded, split fan wheel assembly 68, respectively. The open, split fan wheel assembly 58 is removably attached to the rotor shaft 12 via a hub assembly 53 using a locking device 55, e.g., a bolt. A plurality of fan blades 57 are removably attached to the open, split fan wheel assembly 58.

The shrouded, split fan wheel assembly 68 is removably attached to the rotor shaft 12 via a hub assembly 63 with a locking device 65, e.g., a bolt. A plurality of fan blades 67 and shrouds 69 are removably attached to the shrouded, split fan wheel assembly 68.

The invention has been described in detail including preferred embodiments thereof. However, modifications and improvements within the scope of this invention will occur to those skilled in the art. The above description is intended to be exemplary only. The scope of this invention is defined only by the following claims and their equivalents.

The invention claimed is:

1. A method of assembling a sectionalized device for transporting a material suspended in a fluid about a rotary element, the method comprising the steps of:

providing a split fan wheel assembly that includes a slotted area in each of a first and second portion of the fan wheel assembly;

attaching a plurality of splice plates to the first portion of the fan wheel assembly;

positioning said first portion of said fan wheel assembly about the rotary element;

applying a sealant to the slotted area in said first portion of said fan wheel assembly; and attaching said second portion of said fan wheel assembly to said first portion, wherein the step of attaching the second portion of the fan wheel assembly includes aligning the first and second portions of the fan wheel assembly using multiple radially arranged alignment holes in each of the splice plates.

2. The method as recited in claim 1, wherein the step of attaching the second portion of the fan wheel assembly includes attaching the first and second portions of the fan wheel assembly using a plurality of attaching devices.

3. The method as recited in claim 1, wherein the method comprises the further step of balancing the fan wheel assembly.

4. The method as recited in claim 1, wherein the method comprises the further steps of:

providing a split shroud assembly having a first and a second portion;

attaching a plurality of splice plates to the first portion of the shroud assembly;

positioning a first portion of the shroud assembly about the rotary element; and attaching the second portion of said shroud assembly to said first portion.

5. The method as recited in claim 4, wherein the splice plates of the portions of the fan wheel assembly and the splice plates of the portions of the shroud assembly are disposed about 90 degrees with respect to each other.

6. The method as recited in claim 4, wherein the step of attaching the second portion of the shroud assembly about the rotary element includes the steps of:

aligning the first and second portions of the shroud assembly using alignment holes in each of the plurality of splice plates; and attaching the first and second portions of the shroud assembly using a plurality of attaching devices.

7. The method as recited in claim 1, wherein the method comprises the further step of balancing the fan wheel and shroud assemblies.

8. A method of assembling a sectionalized exhaust fan for a high-speed attrition-type pulverizer about a rotary element, the method comprising the steps of:

providing a split fan wheel assembly that includes a slotted area in each of a first and second portion of the fan wheel assembly;

attaching a plurality of splice plates to the first portion of the fan wheel assembly;

positioning said first portion of said fan wheel assembly about the rotary element in the exhaust portion of the pulverizer;

applying a sealant to the slotted area in said first portion of said fan wheel assembly; and attaching said second portion of said fan wheel assembly to said first portion, wherein the step of attaching the second portion of the fan wheel assembly includes aligning the first and second portions of the fan wheel assembly using multiple radially arranged alignment holes in each of the splice plates.

9. The method as recited in claim 8, wherein the step of attaching the second portion of the fan wheel assembly includes attaching the first and second portions of the fan wheel assembly using a plurality of attaching devices.

10. The method as recited in claim 8, wherein the method comprises the further step of balancing the fan wheel assembly.

11. The method as recited in claim 8, wherein the method comprises the further steps of:

providing a split shroud assembly having a first and a second portion;

attaching a plurality of splice plates to the first portion of the shroud assembly;

positioning a first portion of the shroud assembly about the rotary element; and attaching the second portion of said shroud assembly to said first portion.

12. The method as recited in claim 11, wherein the split plates of the portions of the fan wheel assembly and the splice plates of the portions of the shroud assembly are disposed about 90 degrees with respect to each other.

13. The method as recited in claim 11, wherein the step of attaching the second portion of the shroud assembly about the rotary element includes the steps of:

aligning the first and second portions of the shroud assembly using alignment holes in each of the plurality of splice plates; and attaching the first and second portions of the shroud assembly using a plurality of attaching devices.

14. The method as recited in claim 8, wherein the method comprises the further step of balancing the fan wheel and shroud assemblies.

* * * * *